United States Patent
Hansen et al.

(10) Patent No.: US 9,592,847 B2
(45) Date of Patent: Mar. 14, 2017

(54) STEERING COLUMN ARRANGEMENT WITH TORSION DAMPER ELEMENT, AND ASSEMBLY METHOD

(71) Applicant: Daimler AG, Stuttgart (DE)

(72) Inventors: Detlef Hansen, Schenefeld (DE); Torsten Harms, Hamburg (DE); Horst Hartmann, Witzhave (DE); Frank Rohwer, Moisburg (DE); Marco Schwieger, Hamburg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/386,989

(22) PCT Filed: Jan. 19, 2013

(86) PCT No.: PCT/EP2013/000158
§ 371 (c)(1),
(2) Date: Sep. 22, 2014

(87) PCT Pub. No.: WO2013/139411
PCT Pub. Date: Sep. 26, 2013

(65) Prior Publication Data
US 2015/0045126 A1    Feb. 12, 2015

(30) Foreign Application Priority Data
Mar. 23, 2012   (DE) .................. 10 2012 005 836

(51) Int. Cl.
*B62D 1/20*   (2006.01)
*F16D 3/12*   (2006.01)
(Continued)

(52) U.S. Cl.
CPC ............... *B62D 1/20* (2013.01); *B62D 7/224* (2013.01); *F16D 3/12* (2013.01); *F16D 3/387* (2013.01);
(Continued)

(58) Field of Classification Search
CPC . B62D 1/16; B62D 1/163; B62D 1/18; B62D 1/19; B62D 1/20; B62D 7/224;
(Continued)

(56) References Cited

U.S. PATENT DOCUMENTS 4,270,367 A * 6/1981 Santore ..................... F16D 3/06
403/109.3
5,916,026 A * 6/1999 Sadakata ................ B62D 1/192
464/89
(Continued)

FOREIGN PATENT DOCUMENTS

DE    10 2008 038 029 A1    8/2009
DE    10 2009 034 337 A1    1/2011
(Continued)

OTHER PUBLICATIONS

International Search Report dated Apr. 8, 2013 with English translation (seven (7) pages).
(Continued)

*Primary Examiner* — Josh Skroupa
(74) *Attorney, Agent, or Firm* — Crowell & Moring LLP

(57) ABSTRACT

A steering column arrangement has a sliding sleeve and a universal joint yoke, which has a receiving section in which the sliding sleeve is included at least in sections and coaxially. The covering outer surface of the sliding sleeve and the covering inner surface of the receiving section have molded components for the positive connection. A torsion damper element is arranged between the sliding sleeve and the receiving section of the universal joint yoke. This is an annular arrangement, including an inner carrier ring, an outer carrier ring and an elastomer ring arranged between them. The inner carrier ring and outer carrier ring are elastic in a radial direction and rigid in an axial direction.

12 Claims, 4 Drawing Sheets

Figure 1:
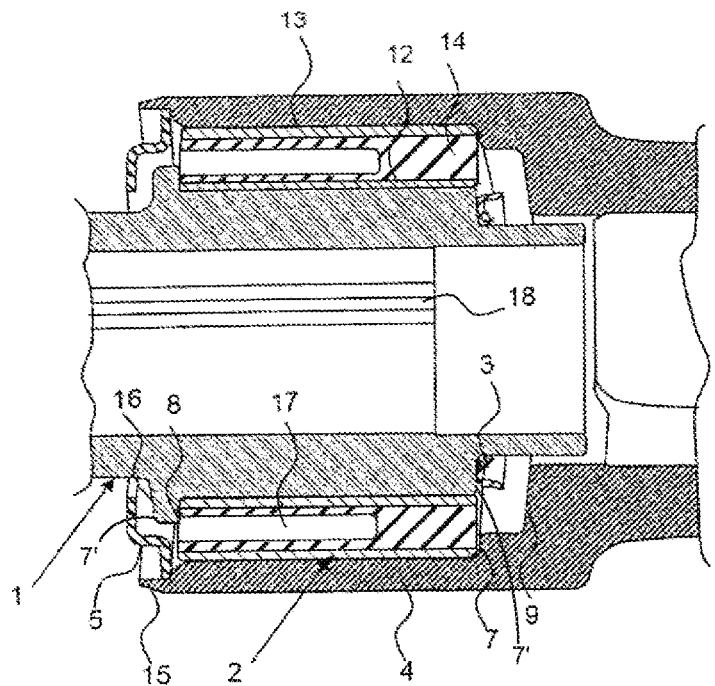

(51) Int. Cl.
*F16D 3/38* (2006.01)
*F16D 3/76* (2006.01)
*F16F 1/38* (2006.01)
*B62D 7/22* (2006.01)

(52) U.S. Cl.
CPC .............. *F16D 3/76* (2013.01); *F16F 1/3863* (2013.01); *F16D 2250/0084* (2013.01); *F16D 2300/22* (2013.01); *Y10T 29/4984* (2015.01)

(58) Field of Classification Search
CPC .......... F16C 3/035; F16C 3/387; F16C 29/04; F16C 29/08; F16C 33/723; F16C 2250/0084; F16C 2300/22; F16C 2326/24; F16D 3/065; F16D 3/10; F16D 3/12; F16D 3/50; F16D 3/76; F16D 3/78; F16D 3/84; F16D 3/841; F16D 3/843; F16F 1/3863; Y10T 29/4984
USPC ............. 464/89, 92–96, 127, 162, 169, 180; 29/434
See application file for complete search history.

(56) References Cited

U.S. PATENT DOCUMENTS 7,316,418 B2 * 1/2008 Goto ...................... B62D 7/224
280/779

2002/0173362 A1 * 11/2002 Sadakata ................ B62D 1/192
464/84
2007/0265101 A1  11/2007 Maierbacher et al.
2012/0004043 A1   1/2012 Lehmann
2013/0228034 A1   9/2013 Hebenstreit et al.
2014/0018177 A1   1/2014 Drechsler et al.

FOREIGN PATENT DOCUMENTS

| DE | 10 2010 049 106 A1 | | 6/2011 | |
| EP | 1 260 725 A2 | | 11/2002 | |
| FR | 2526101 | * | 11/1983 | ............... F16D 3/00 |
| FR | 2701518 | * | 8/1994 | ............... B62D 1/16 |
| WO | WO 2006/045516 A1 | | 5/2006 | |
| WO | WO 2010/102611 A1 | | 9/2010 | |
| WO | WO 2012/095319 A1 | | 7/2012 | |

OTHER PUBLICATIONS

German-language Written Opinion (PCT/ISA/237) dated Apr. 8, 2013 (seven (7) pages).
Chinese-language Office Action issued in counterpart Chinese Application No. 201380015940.1 dated Jul. 12, 2016 with English translation (11 pages).

* cited by examiner

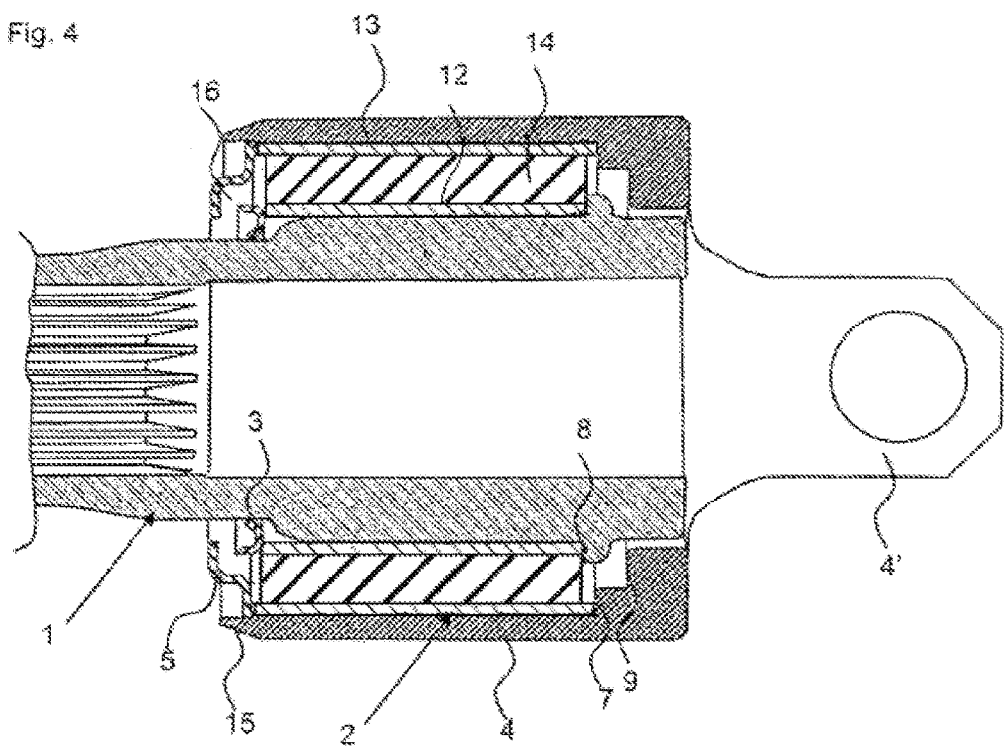
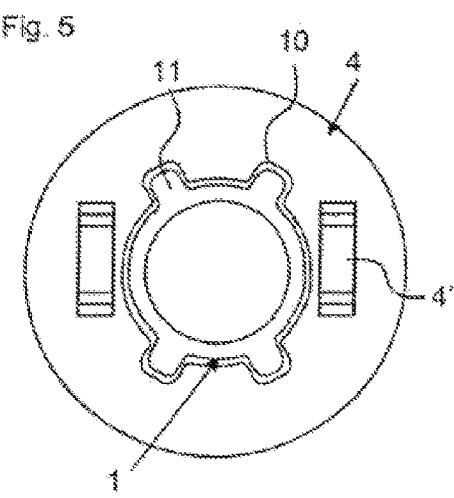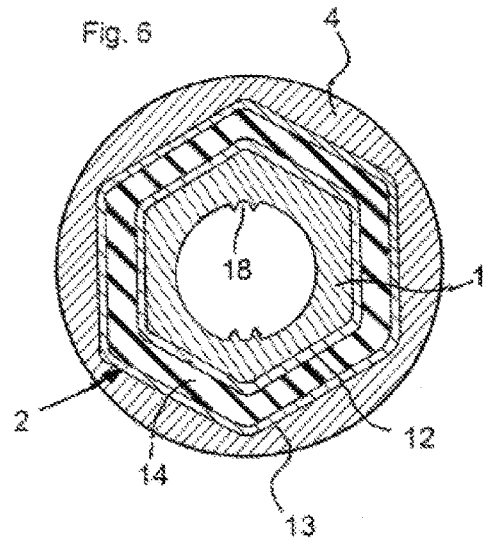

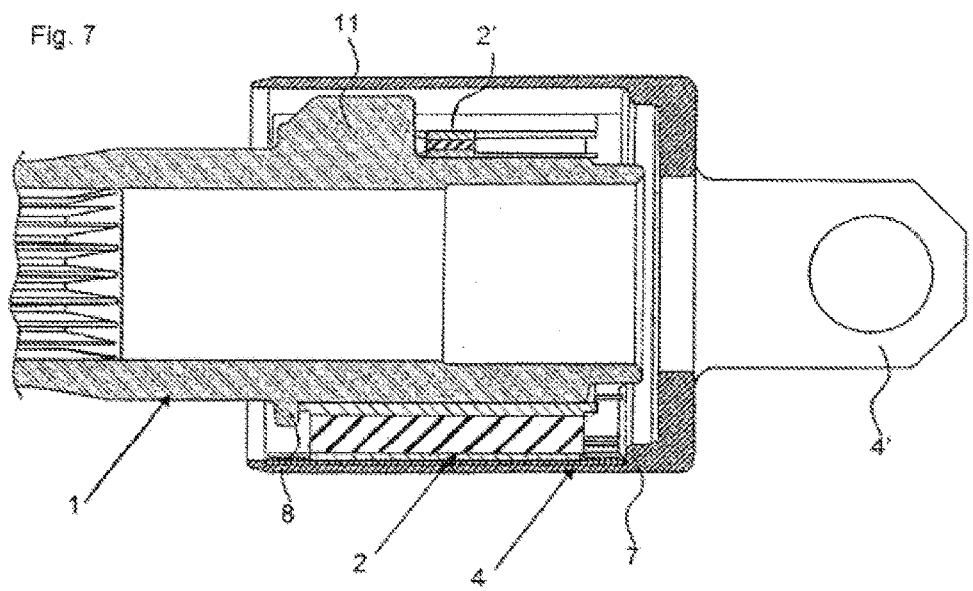
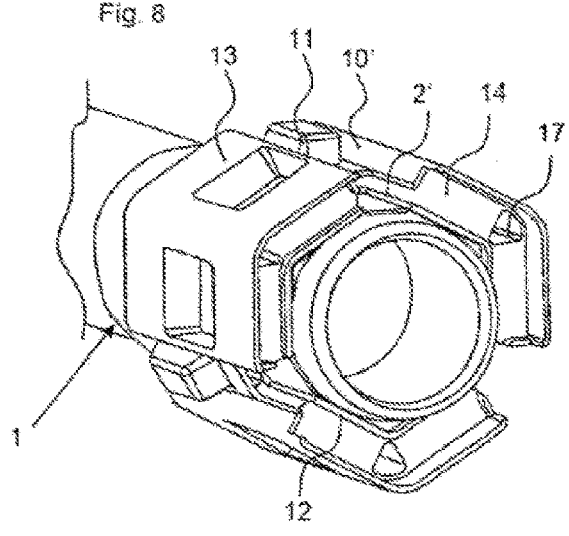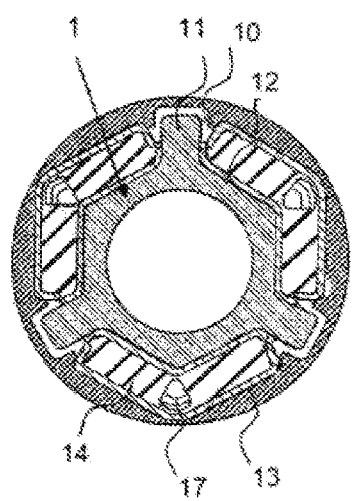

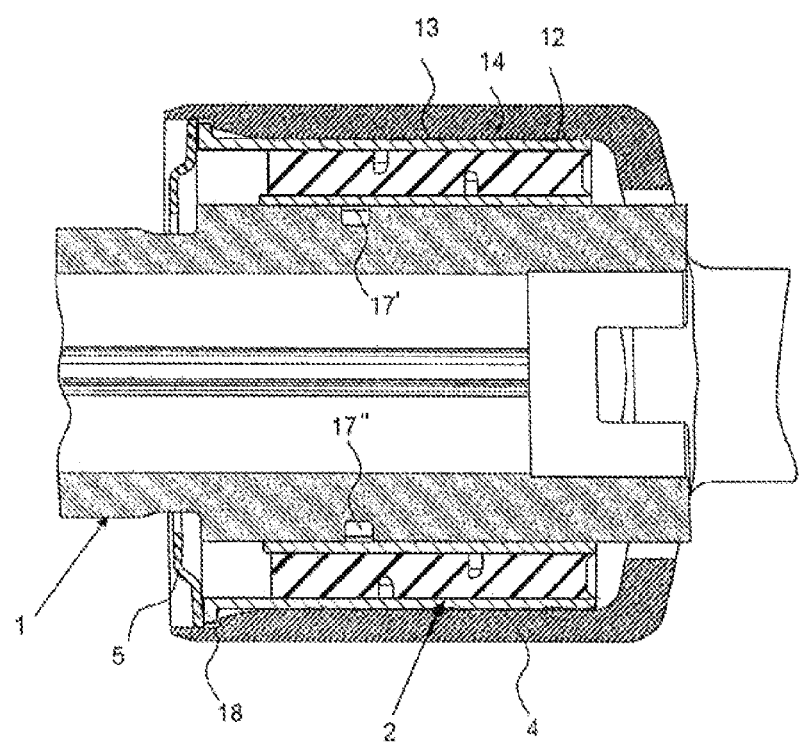

STEERING COLUMN ARRANGEMENT WITH TORSION DAMPER ELEMENT, AND ASSEMBLY METHOD

BACKGROUND AND SUMMARY OF THE INVENTION

Exemplary embodiments of the invention relate to a steering column arrangement having a torsion damper element and a corresponding assembly method.

It is known from prior art to decouple the vibrations and sounds induced by the chassis in the direction of the steering wheel using a torsion damper arranged in the steering column. During the zero-backlash torque transmission between the output of the steering column and the input of the steering gear, a torsion damper is installed for the integration of vibrations, shocks and forces, which presently does not entirely fulfil the requirements for the damper and decoupling properties.

Conventional torsion dampers consist of a vulcanized elastomer in processed carrier geometries. Pre-processes of blasting and priming are required for the secure adherence of the elastomer, whereby the latter step in the production process is potentially hazardous to human health, and the processing procedure is altogether highly complex.

German patent document DE 10 2008 038 029 A1 describes a coupling device for a vehicle steering spindle, which has an elastic layer between an outer shaft and an inner shaft. German patent document DE 10 2008 038 029 A1 focuses on the constructional design, wherein the covering outer surface of the inner shaft has at least one outer flat region and the covering inner surface of the outer shaft has a corresponding inner flat region. A curve support and a restriction of the torsion angle are therefore provided and torsional reliability is ensured in the case of a defect of the intermediate layer. The corresponding outer and inner surface areas can also be provided in pairs on the covering outer surface of the inner shaft and the covering inner surface of the outer shaft and form a diehedron or a hexagon, for example.

Alternatively to the elastomer torsion damper element, the installation of riveted flexible discs with central bushing is conceivable, however the construction space requirements are frequently not fulfilled.

In view of this prior art exemplary embodiments of the present invention are directed to a steering column arrangement having improved damping properties and good torque transmission between the output of the steering column and the input of the steering gear, wherein the torsion damper should be simple and safe to assemble.

A first embodiment relates to a steering column arrangement having a sliding sleeve and a universal joint yoke, which has a receiving section, in which the sliding sleeve having at least one section is included coaxially. The covering outer surface of the sliding sleeve and the covering inner surface of the receiving section have molded components, such as for example the outer flat regions of the sliding sleeve and inner flat regions of the receiving section known from the prior art for positive connection. Furthermore, a torsion damper element is arranged between the sliding sleeve and the receiving section of the universal joint yoke.

According to the invention, the torsion damper element is formed by an annular arrangement made from an inner carrier ring and an outer carrier ring and an elastomer ring arranged between them, wherein the carrier rings are designed to be elastic in a radial direction and rigid in an axial direction, for example by appropriate choice of materials.

The steering column arrangement according to the invention is characterized by its torsion damper element built as a ring element, which can be installed as a single unit through suitable choice of materials and manufacturing concept. Thus, priming can be avoided and handling during the manufacturing process is simplified. The carrier rings allow for a less complicated assembly of the damper element and additionally the damping properties are improved.

The annular arrangement is pressed onto the sliding sleeve, and the sliding sleeve is pressed with the annular arrangement into the receiving section.

For the accurate axial positioning of the annular arrangement, the sliding sleeve can have an inset or a stopper on its outer covering, which can be formed by an annular collar, by pins or latches. The inset or the stopper located on the sliding sleeve can thereby be provided close to a receiving opening of the receiving section within the receiving section or near the end of the sliding sleeve received in the receiving section. A securing element such as a plate spring or a circlip for securing the annular arrangement is arranged at the end of the annular arrangement facing away from the inset, or is pressed onto the sliding sleeve.

In the receiving section of the universal joint yoke, at least one stepped projection pointing radially inwards is provided on the end facing away from the receiving opening as an inset for the annular arrangement, or above the annular arrangement for the sliding sleeve during the press-in operation.

Furthermore, the steering column arrangement can comprise a further securing element such as a securing ring, which is arranged in the receiving opening, preferably pressed into it. The inset of the sliding sleeve close provided close to the receiving opening of the receiving section can come into contact with this. A tight fit of the securing element can be provided by a remolded material overhang of the receiving section on the receiving opening.

In another embodiment of the steering column arrangement, the sliding sleeve can have an annular groove on its outer covering and the inner carrier ring can have at least one corresponding fastening element on its inner covering, the element having at least one annular collar or at least one latch. Here, the fastening element engages with the annular groove. The outer carrier ring has a radially outwardly protruding annular collar close to the receiving opening of the receiving section, which makes contact with a radially inwardly recessed layer on the covering inner surface of the receiving section close to the receiving opening. Furthermore, the steering column arrangement then also comprises a securing element, such as preferably a securing ring, which is arranged in the receiving opening of the receiving section, such that the outer carrier ring with the annular collar comes into contact with the securing element and is thereby advantageously fixed.

For weight reduction and/or stiffness adjustment, the elastomer ring can have axial keyhole slots as blind holes and/or through holes. For the material of the outer and inner carrier ring a plastic can preferably be used, which provides the rigid design of the same in the axial direction and the elastic design in the radial direction.

In order to form the positive connection between the sliding sleeve and the receiving section, the covering outer surface of the sliding sleeve, the annular arrangement and the covering inner surface of the receiving section can have contours deviating from the circular shape for the formation of the molded components that provide the positive connection. The molded components can be equipped with a many-sided, for example a six-sided, contour or a star-shaped or interlocked contour and are particularly preferably equipped, for example, with six corners or teeth.

Furthermore, the sliding sleeve can have at least one projection protruding radially outwards like an arm, cam or web on its covering outer surface, which is absorbed with clearance in a corresponding recess in the covering inner surface of the receiving section, in order to provide overload protection for excessive steering torques. Thereby, the torque transmission between the universal joint yoke and the sliding sleeve when the projection strikes the recess directly between the universal joint yoke and sliding sleeve and advantageously not via the torsion damper element.

To that end, even two or more projections arranged on the periphery of the covering outer surface can be arranged in pairs opposite to one another or evenly distributed and corresponding recesses can be arranged in the covering inner surface of the receiving section.

Furthermore, the sliding sleeve can have at least two axial grooves located opposite each other on their covering inner surface, with which a spring can engage, which is formed on a single-plated steering spindle part that is to be slid into the sliding sleeve.

The simple assembly method according to the invention for such a steering column arrangement first comprises the provision of the sliding sleeve and a universal joint yoke having a receiving section for the sliding sleeve and the insertion of an elastomer ring between an inner carrier ring and an outer carrier ring for the formation of the torsion damper element designed as an annular arrangement. Here, the inner and outer carrier rings are embodied elastically in a radial direction and rigidly in an axial direction. The annular arrangement is pressed onto the sliding sleeve and the sliding sleeve is pressed in the receiving section of the universal joint yoke together with the pressed annular arrangement. To complete the assembly method, the yoke part of the universal joint yoke is connected to a steering wheel-side counter element and a steering spindle is received in the receiving section.

The torsion damper element presently relates to three basic units, which can be joined simply without further processing; the elastomer of the torsion damper element is located between two plastic carriers, which allow for simple assembly. The specific geometry of the torsion damper element ensures good damping and decoupling properties. The adherence of the elastomer to the plastic is achieved without abrasive blasting and priming.

Further steps of the method according to the invention relate to the axial positioning of the annular arrangement on the sliding sleeve by pressing the annular arrangement onto the inset and the axial positioning of the sliding sleeve with the annular arrangement in the receiving section by pressing onto the stepped projection.

Furthermore, the pressing of a first securing element onto the sliding sleeve on the end of the annular arrangement facing away from the inset and/or the pressing of a second securing element in the receiving opening of the receiving section can take place, wherein, in the latter case, the remolding of a material overhang of the receiving section on the receiving opening can additionally be carried out for the formation of a tight fit of the securing element.

Alternatively, the annular arrangement can be positioned axially during the pressing of the annular arrangement by the fastening elements of the inner carrier ring in the annular groove of the sliding sleeve snapping into place. Furthermore, the sliding sleeve having the annular arrangement in the receiving section is positioned axially during pressing, which is achieved through the laying out of the outwardly protruding annular collar of the outer carrier ring on the radially inwardly stepped level on the covering inner surface of the receiving section close to the receiving opening. The pressing of the securing elements in the receiving opening of the receiving section takes place, and thereby the ribbing of the annular collar and thus fixing in the receiving section on the receiving opening. In this way, a tight and secure fit is advantageously achieved.

These and other advantages are demonstrated by the description below with reference to the accompanying figures. The reference to the figures in the description serves for the simplified understanding of the subject matter. The figures are only a schematic depiction of an embodiment of the invention.

BRIEF DESCRIPTION OF THE DRAWING FIGURES

Figure 2:
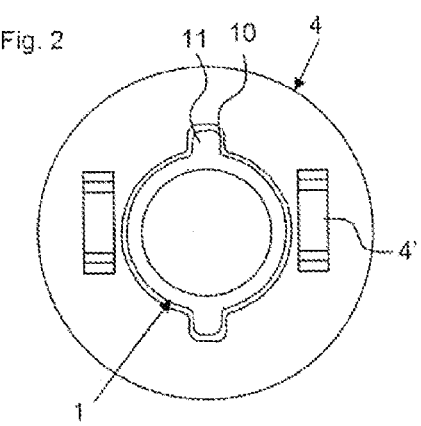
Figure 3:
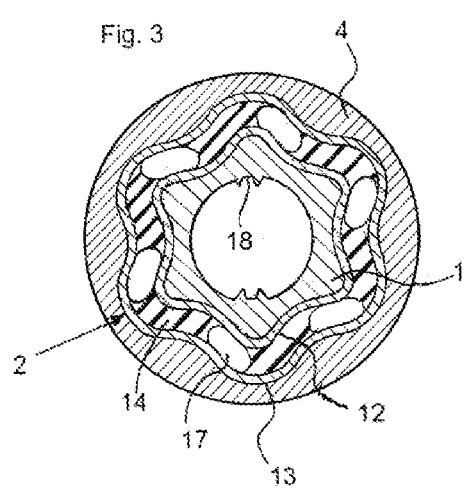

Here are shown:

FIG. 1 a longitudinal sectional view through the steering column arrangement with a torsion damper element according to a first embodiment, FIG. 2 a frontal view of the steering column arrangement from FIG. 1, FIG. 3 a cross-sectional view through the steering column arrangement from FIG. 1, FIG. 4 a longitudinal sectional view through the steering column arrangement with the torsion damper element according to a further embodiment, FIG. 5 a frontal view of the steering column arrangement from FIG. 4.

FIG. 6 a cross-sectional view through the steering column arrangement from FIG. 4, FIG. 7 a longitudinal sectional view through the steering column arrangement with the torsion damper element according to a further embodiment, FIG. 8 a perspective view of the sliding sleeve and the torsion damper element of the steering column arrangement arranged thereon from FIG. 7.

FIG. 9 a cross-sectional view through the steering column arrangement from FIG. 7, FIG. 10 a longitudinal sectional view through the steering column arrangement with the torsion damper element according to a further embodiment.

DETAILED DESCRIPTION

The invention relates to a steering column arrangement with a torsion damper, which is arranged in a receiving section of a universal joint yoke, as shown in different variants in FIGS. 1 to 10 according to the invention, as well as a method for the assembly of this steering column arrangement. In order to guarantee satisfactory torque transmission between the output of the steering spindle and the input of the steering gear and to make a safe and easy assembly of the torsion damper possible, a sliding sleeve 1, which is provided for the reception of a steering spindle part that transmits steering torque, is used and, for the formation of the torsion damper, an elastomer ring 14 is placed between an inner and outer carrier ring 12, 13 from a radially elastic, but axially stiff material such as plastic. This annular arrangement 2 is pressed onto the sliding sleeve 1, and then, together with the annular arrangement 2 situated there, is pressed into an axial receiver of the receiving section 4 of the universal joint yoke. These can then be connected with the counterpart of the universal joint yoke.

On the outer covering of the sliding sleeve 1, an inset 8 is formed in the form of an annular collar or from pins and latches, in order to position the annular arrangement 2 with axial positional accuracy. The inset 8 can, as in the examples shown in FIGS. 1 and 7, be provided at a distance from the end of the sliding sleeve 1 received in the receiving section 4, and thereby close to the receiving opening of the receiving section 4, but still arranged within the receiving section 4. FIG. 4 shows a variant in which the inset 8 close to the sleeve end received in the receiving section 4 is provided.

On the side facing away from the inset 8 with respect to the annular arrangement 2, the annular arrangement 2 can be fixed axially by a securing element 3 pressed onto the sliding sleeve 1, wherein this can be a plate spring or circlip, for example.

Furthermore, the receiving section 4 of the universal joint yoke can have a stepped projection 7 facing radially inwards in the receiver on the end facing away from the receiving opening, the projection forming an inset for the annular arrangement 2 and thus for the sliding sleeve 1 when pressed into the receiver of the receiving section 4.

The sliding sleeve 1, together with the annular arrangement 2, can furthermore be secured from shifting by a securing ring 5 pressed into the receiver close to the opening, in particular in the case of a possible failure of the elastomer 14 in the torsion damper. Here, the sliding sleeve 1 having an inset 16 fastens onto the securing ring 5 in the variants with the inset 8 close to the receiving opening of the annular collar 8.

The elastomer ring 14 can have axial keyhole slots 17 in the interest of easy assembly and for the adjustment of stiffness of the torsion damper, which can be blind holes 17 or through holes, as can be seen in FIGS. 1, 3, 8 and 9.

Preferably, the sliding sleeve 1 and the annular arrangement 2 as well as the correspondingly contoured covering inner surface of the receiving section 4 of the universal joint yoke have a cross-sectional shape that differs from a circle, in order that a positive connection be produced in addition to the frictional connection caused by the impression, with which the transmission of torques is even better guaranteed. To that end, FIG. 3 shows a star-shaped contour and FIG. 6 shows a regular hexagon, which can fundamentally also be seen in FIG. 9, but in this case with disruptions that are caused by the receiving openings 10 for the overload protection cams 11.

The overload protection cams 11 or arms are provided on the sliding sleeve 1 in the region of an end and point radially outwards. The cams 11 of the sliding sleeve 1 are immersed in corresponding recesses 10 of the receiver of the receiving section 4 of the universal joint yoke with clearance. Provision can thereby be made for two cams 11 arranged opposite one another on the periphery, as in FIG. 2, to engage with corresponding recesses 11, which are provided in the receiving section 4 in such a way that an imaginary line through the cams 11 or the recesses 10 passes perpendicular to a line connecting the yoke positioners. Alternatively, four cams 11, as can be seen in FIG. 5, can be provided, which are arranged opposite one another in pairs on the periphery of the sliding sleeve 1, wherein the two pairs of cams are arranged here in an X-shape, such that no recesses 10 for the cams 11 run in the region of the yoke positioners 4'. FIG. 9 shows a variant with three cams 11 immersed into corresponding recesses 10, which are distributed evenly over the periphery. Due to the arrangement with clearance of the cams 11 in the recesses 10, overload protection is provided for excessive steering torques. The cams 11 thereby come into direct contact with the receiving section 4 of the universal joint yoke and torque transmission is guaranteed in this case.

An arrangement of this kind, where the sliding sleeve is fitted with wing-like webs, which are immersed into corresponding receivers of the torsion damper, is known from German patent document DE 10 2010 049 106. Furthermore, it is described there that the sliding sleeve for the reception of a steering spindle, having an external gear, is to be fitted with an inner gear. Thus, the sliding sleeve 1 can furthermore have, on its inner side, as can be seen in FIGS. 3 and 6, at least two axial grooves 18 opposite one another, into which a respective spring, arranged on the steering spindle part built that is to be inserted for ensuring a desired relative rotary position of the steering spindle with respect to the sliding sleeve or the universal joint yoke, can be inserted.

The assembly of the steering column arrangement is illustrated in greater detail below with reference to FIGS. 1 to 3.

The damper element 2 consisting of the two plastic carrier rings 12, 13 having the elastomer ring 14 located between them is pressed in the correct position onto the sliding sleeve 1 up to the inset 8 by means of a suitable pressing tool. The inner plastic carrier ring 12 is thereby expanded over the dimensions of the covering outer surface of the sliding sleeve 1 and thus produces a press fit. For an additional axial securing of the annular arrangement 2 forming the damper element, this is secured to the sliding sleeve 1 by means of a securing element 3. Alternative, the caulking of the sliding sleeve 1 for the positioning and axial securing of the damper element 2 is possible as a variant to the securing element 3.

To complete the assembly, the components sliding sleeve 1 and annular arrangement 2, which are joined in this way, are pressed into the receiving section 4 of the universal joint yoke by means of a suitable pressing tool, wherein the outer plastic carrier ring 13 of the damper element 2 having the dimensions of the universal joint yoke provided by the covering inner surface of the receiving section 4 produces a press fit, until the outer plastic carrier ring 13 comes into contact with the stepped projection 7 in the receiving section 4 of the universal joint yoke, or until the securing element 3 makes contact with the inset 9 in the receiving section 4 of the universal joint yoke, wherein the sliding sleeve 1 with the outer plastic carrier ring 13 forces the sliding sleeve 1 into an axial position through the over-tensioned elastomer ring 14 of the damper element 2, in which position the elastomer 14 of the damper element 2 is formed with the least possible stress in an axial direction.

The installation is completed by the assembly of a further securing element 5 in the receiving opening of the receiving section 4 of the universal joint yoke and the generation of a tight fit of the securing element 5 in the receiving section 4 by remolding the material overhang 15 on the receiving opening of the universal joint yoke 4.

With the steering column arrangement assembled in this way, the steering torque of the driver is transmitted via the universal joint yoke 4 into the damper element formed by the annular arrangement 2, via the outer plastic carrier ring 13 into the elastomer 14, and thus onto the inner plastic carrier ring 12, which in turn transmits the steering torque to the steering gear via the sliding sleeve 1. Due to the specific geometry of the damper unit 2, advantages arise for the durability of the elastomer 14 and damping properties.

If excessive steering torques are introduced via the universal joint yoke 4 into the torsion damper 2, the receiving section 4 of the universal joint yoke are brought into contact with the sliding sleeve 1 for the protection thereof on the contact edges of the recess 10, via the cams 11 and hence a forced guidance of the sliding sleeve 1 is produced. This forced guidance is also required in the event that the elastomer 14 of the damper element 2 remains without function. In this case, a dismantling of the installation is prevented via the securing element 5 by the sliding sleeve 1 in the region 16 coming into contact with the securing element 5 and cohesion thus being produced. As a variant to the securing element 5, caulking of the universal joint yoke 4 for the positioning and axial securing of the damper element 2 is possible.

FIGS. 4 to 6 and 7 to 9 show variants of the steering column arrangement according to the invention.

Thus, FIG. 4 shows a variant having a damper element 2 assembled in the opposite direction (in comparison to FIG. 1). For this, the secured inset 8 close to the end of the sliding sleeve 1 with regard to FIG. 1, is located on the other end of the annular arrangement 2. The securing element 3 is then accordingly assembled on the opposite side of the annular arrangement 2, so close to the receiving opening. This variant has (as is shown in FIG. 5) four cams 11 on the sliding sleeve as forced guidance, which are in turn immersed into a corresponding number recesses 10 in the receiving joint yoke 4 and thus are able to be supported on the insets 10 formed by the contact edges. FIG. 6 shows an alternative geometry of the damper element 2 from that of FIG. 3 in the form of a hexagon. However, other geometries which provide a form fit are also conceivable.

FIGS. 7 to 9 show the shape of a torsion damper 2 for a smaller diameter (52 mm instead of 60 mm). The construction and installation of the torsion damper 2 is similar to that of FIGS. 1 and 3; however, this torsion damper variant possesses three cams 11 for the secured inset.

FIG. 10 shows a variant having an alternatively embodied axial securing of the torsion damper element 2, which is herein secured to the sliding sleeve 1. To that end, the sliding sleeve 1 has an annular groove 17", into which a latch 17' provided on the inner carrier ring 12 engages. The damper element 2 or its outer carrier ring 13 has a radially outwardly protruding coil 18 added to it, which is fixed and ribbed with the securing element 5, and this is to be axially secured in the receiving section 4 of the universal joint yoke. In this embodiment, a securing element 3, cf. FIGS. 1 and 4, can be dispensed with.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A steering column arrangement, comprising:
a sliding sleeve having a stopper directly arranged on the sliding sleeve;
a universal joint yoke having a receiving section with a receiving opening, in which the sliding sleeve is included at least in sections and coaxially, wherein an outer surface of the sliding sleeve and an inner surface of the receiving section have components for positive connection, wherein the receiving section has at least one radially inwardly facing stepped projection on an end of the receiving section facing away from the receiving opening; and
a torsion damper element arranged between the sliding sleeve and the receiving section of the universal joint yoke,
wherein the torsion damper element is an annular arrangement, which comprises an inner carrier ring, an outer carrier ring, and an elastomer ring arranged between the inner and outer carrier rings,
wherein the inner carrier ring and the outer carrier ring are elastic in a radial direction and inelastic in an axial direction,
wherein the elastomer ring has at least one of an axial keyhole slot, a blind hole, and a through hole, and
wherein an end of the inner carrier ring is in contact with the stopper of the sliding sleeve and an end of the outer carrier ring is in contact with the at least one radially inwardly facing stepped projection of the receiving section.

2. The steering column arrangement of claim 1, wherein the stopper is arranged on a covering of the sliding sleeve, wherein the stopper is formed from an annular collar, pin or latches,
the steering column arrangement further comprises a securing element, which is arranged on an end of the torsion damper element facing away from the stopper,
the securing element is a plate spring or circlip,
the stopper is provided adjacent to the receiving opening of the receiving section within the receiving section or adjacent to an end of the sliding sleeve received in the receiving section.

3. The steering column arrangement of claim 1, wherein the at least one radially inwardly facing stepped projection provides a second stopper for the torsion damper element and for the sliding sleeve via the torsion damper element.

4. The steering column arrangement of claim 2, wherein the steering column arrangement comprises a second securing element, which is a securing ring arranged in the receiving opening of the receiving section, wherein the stopper of the sliding sleeve provided adjacent to the receiving opening of the receiving section comes into contact with the second securing element, and wherein an overhang of the receiving section allows the securing element to fit on the receiving opening.

5. The steering column arrangement of claim 1, further comprising:
an annular groove on a covering of the sliding sleeve;
at least one fastening element, corresponding to the annular groove, on an inner surface of the inner carrier ring, comprising an annular collar or at least one latch, wherein the at least one fastening element engages with the annular groove, and the outer carrier ring is formed adjacent to the receiving opening of the receiving section with a radially outwardly protruding annular collar, which comes into contact with a radially inwardly facing layer on the inner surface of the receiving section adjacent to the receiving opening; and
a securing element, which is a securing ring arranged in the receiving opening of the receiving section, wherein the outer carrier ring with the radially outwardly protruding annular collar comes into contact with and is fixed by the securing element.

6. The steering column arrangement of claim 1, wherein the outer and inner carrier rings are made from plastic.

7. The steering column arrangement of claim 1, wherein the outer surface of the sliding sleeve, the torsion damper element and the inner surface of the receiving section have contours that are coordinated with one another, which form the components for the positive connection and form a polygonal, six-sided, star-shaped, or toothed contour.

8. The steering column arrangement of claim 1, wherein a covering of the sliding sleeve has
at least one projection extending radially outwards, or
two or more projections extending radially outwards on a periphery of the outer surface, wherein the at least two projections are arranged in pairs opposite one another or are distributed evenly, and
wherein the projection or the projections is/are received with clearance in a corresponding recess of the inner surface of the receiving section.

9. The steering column arrangement of claim 1, wherein the sliding sleeve has at least two axial grooves located opposite one another on an inner surface of a covering of the sliding sleeve, wherein the at least two axial grooves engage with a respective spring located on a steering spindle part that is inserted into the sliding sleeve.

10. An assembly method for a steering column arrangement, the method comprising:
providing a sliding sleeve having a stopper directly arranged on the sliding sleeve and a universal joint yoke having a receiving section with a receiving opening for the sliding sleeve, wherein the receiving section has at least one radially inwardly facing stepped projection on an end of the receiving section facing away from the receiving opening;
producing an annular arrangement by inserting an elastomer ring between an inner carrier ring and an outer carrier ring, wherein the inner and outer carrier rings are elastic in a radial direction and inelastic in an axial direction and the elastomer ring has at least one of an axial keyhole slot, a blind hole, and a through hole;
pressing the annular arrangement onto the sliding sleeve;
pressing the sliding sleeve with the annular arrangement into the receiving section; and
connecting a yoke part of the universal joint yoke with a steering wheel-side counter element and receiving a steering spindle in the sliding sleeve, and
wherein an end of the inner carrier ring is in contact with the stopper of the sliding sleeve and an end of the outer carrier ring is in contact with the at least one radially inwardly facing stepped projection of the receiving section.

11. The assembly method of claim 10, further comprising at least one of the steps:
axial positioning the annular arrangement on the sliding sleeve when pressing the annular arrangement on the stopper, and axial positioning of the sliding sleeve with the annular arrangement in the receiving section, when pressing on the at least one radially inwardly facing stepped projection;
pressing a first securing element onto the sliding sleeve on an end of the annular arrangement facing away from the stopper; and
fitting a second securing element by pressing the second securing element in the receiving opening of the receiving section and an overhang of the receiving section on the receiving opening.

12. The assembly method of claim 10, further comprising at least one of the steps:
axial positioning of the annular arrangement on the sliding sleeve when pressing the annular arrangement into an annular groove of the sliding sleeve by locking a fastening element of the inner carrier ring into place;
axial positioning of the sliding sleeve with the annular arrangement in the receiving section when pressing on an inner surface of the receiving section adjacent to the receiving opening by an outwardly protruding annular collar of the outer carrier ring coming into contact with a radially inwardly facing layer; and
ribbing the annular collar and fixing the annular collar in the receiving section on the receiving opening by pressing a securing element in the receiving opening of the receiving section.

\* \* \* \* \*